United States Patent [19]

Elliott, Jr. et al.

[11] 4,325,588
[45] Apr. 20, 1982

[54] BEARING TAKE-UP APPARATUS

[75] Inventors: James R. Elliott, Jr., Indianapolis; Kathy L. Layne, Greenwood; Donald W. Hitch, Lizton; Larry G. Marshall, Lebanon, all of Ind.

[73] Assignee: P T Components, Inc., Indianapolis, Ind.

[21] Appl. No.: 154,749

[22] Filed: May 30, 1980

[51] Int. Cl.³ .............................................. F16C 35/00
[52] U.S. Cl. ....................................... 308/59
[58] Field of Search ............... 74/242.12, 242.13 R, 74/242.13 A, 242.14 R; 308/15, 22, 57, 58, 59, 60, 189 R, 207 R

[56] References Cited

U.S. PATENT DOCUMENTS

| | | | |
|---|---|---|---|
| 452,509 | 5/1891 | Snell | 308/60 X |
| 1,571,009 | 1/1926 | Holzer | 198/817 |
| 1,778,231 | 10/1930 | Sjolander | 308/59 |
| 1,865,087 | 6/1932 | Daniel | 308/57 X |
| 2,179,187 | 11/1939 | Kendall | 198/830 |
| 3,442,559 | 5/1969 | Horvath et al. | 308/59 X |
| 3,921,793 | 11/1975 | Hutchinson | 198/208 |
| 3,926,304 | 12/1975 | Watabe | 198/208 |

OTHER PUBLICATIONS

Sales Literature TDS3-U200, TDS200, DSB2800, DS2800, pp. 82 and 451.

Primary Examiner—Frederick R. Schmidt
Attorney, Agent, or Firm—Robert A. Brown

[57] ABSTRACT

A bearing take-up apparatus includes a rigid base having spaced upstanding walls between which a bearing housing having recesses in its upper surface is slidably received. A threaded screw having anchoring means rigidly secured on its ends and nuts intermediate its ends is lowered onto upper surfaces of the end walls with the nuts positioned to be received within the recesses while the anchoring means overhang the end walls. A cover is lowered over the screw and connecting means are provided for releasably connecting the cover to the end walls.

11 Claims, 4 Drawing Figures

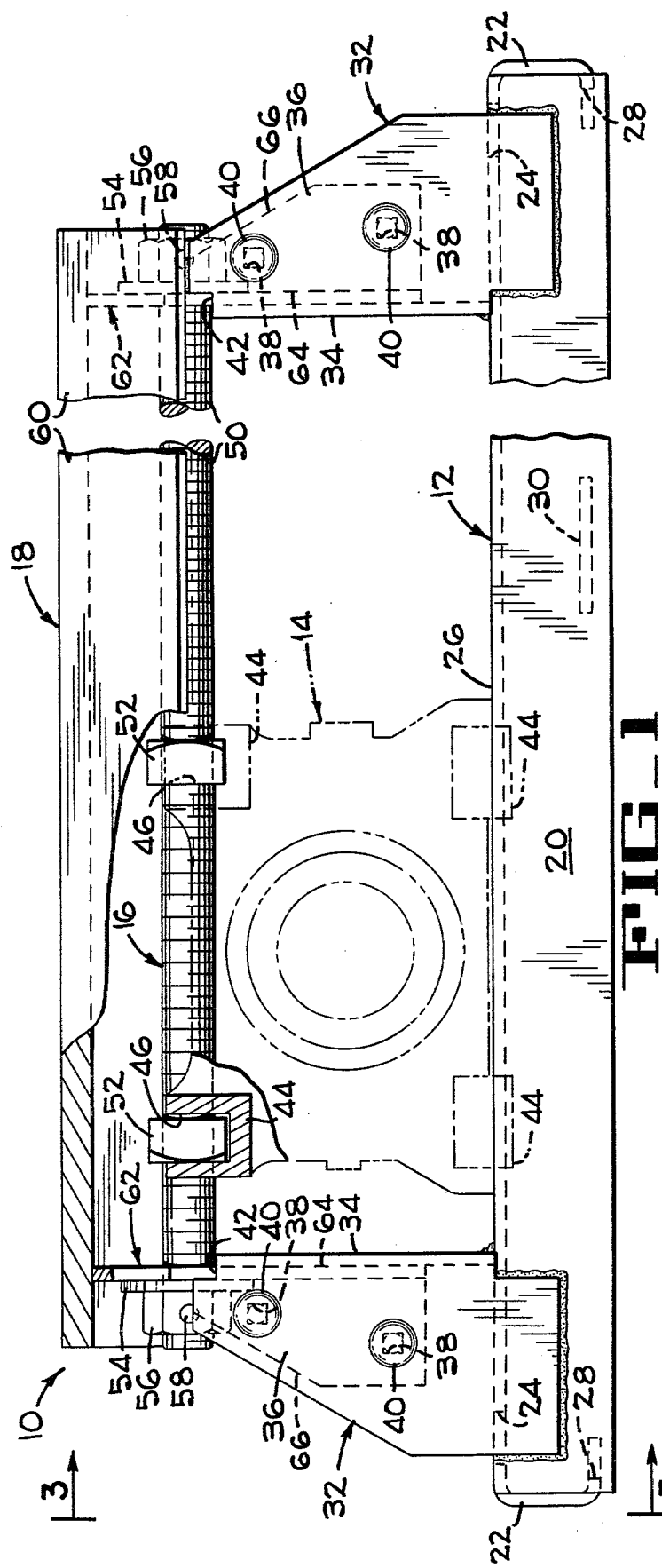
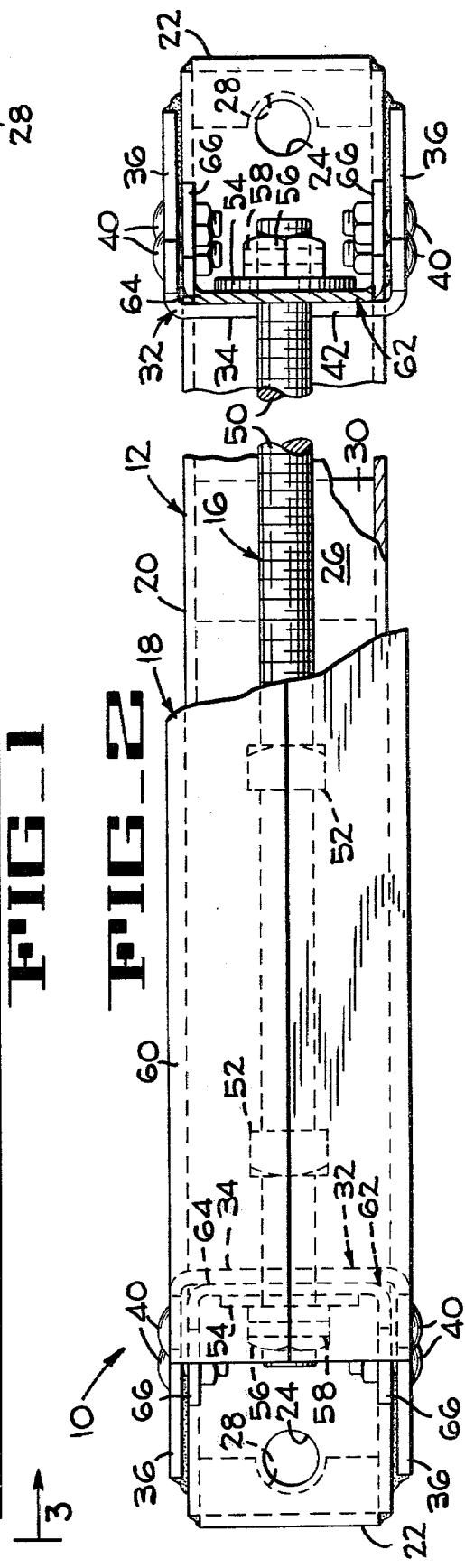

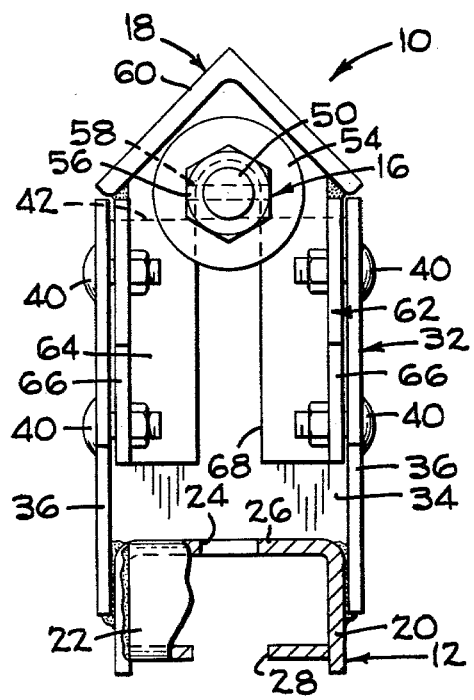
FIG_3
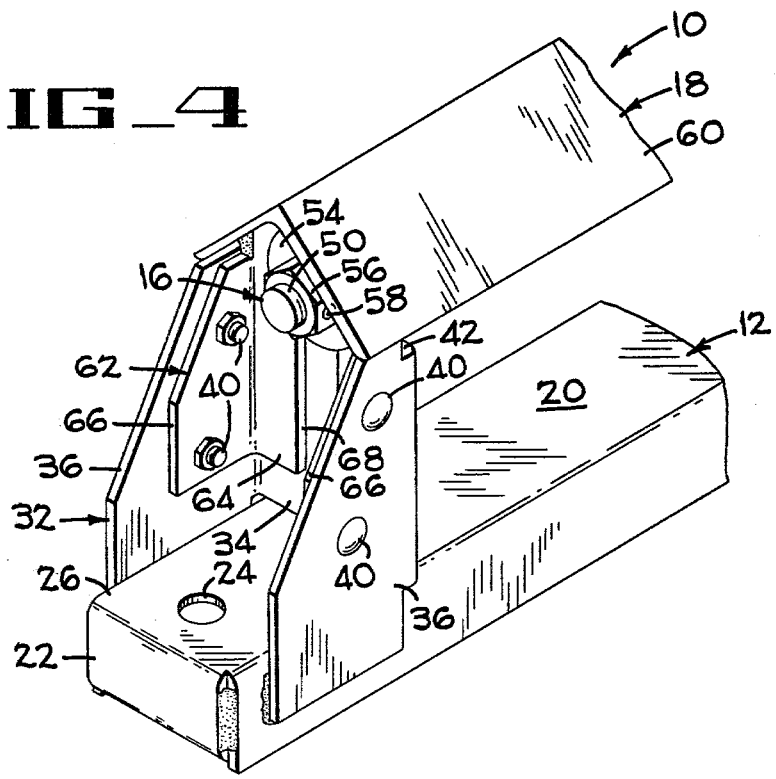
FIG_4

BEARING TAKE-UP APPARATUS

BACKGROUND OF THE INVENTION

1. Field of the Invention

The present invention relates to bearing take-up apparatus, and more particularly relates to such a take-up apparatus that is quickly, easily and safely assembled.

2. Description of the Prior Art

U.S. Pat. No. 1,571,009 which issued to Holzer on Jan. 26, 1926 discloses a bearing take-up apparatus having a base with upstanding end walls rigid therewith and a cover which cooperates with the base to define a guideway which slidably receives a bearing that journals one end of a shaft. The bearing is adjusted longitudinally of the guideway by an adjusting screw which is threaded in one of the end walls and is rotatably received in abutting engagement with the bearing housing.

Another bearing take-up apparatus which is not patented but has been manufactured by the assignee of the present invention for several years, includes a V-shaped cover having end brackets secured thereto and projecting downwardly therefrom. A threaded take-up screw is inserted through holes in the cover end brackets and has two bearing advancing nuts threaded on and positioned within the end brackets, and also has two nuts rigidly secured to the ends of the screw and positioned externally of the end plates. When assembling the take-up screw in the cover end brackets, the cover is inverted and held in a fixture. A bearing is then inverted and is placed in sliding engagement on the lower edges of the cover. The bearing has nut engaging cavities therein which are fitted over the bearing advancing nuts. A take-up frame base is then inverted and is placed in sliding engagement with the bottom of the bearing housing, which base is then bolted to the cover end brackets. The completed prior art bearing take-up frame is then removed from the fixture and is inverted to upright position thereby completing the assembly operation of the prior art device.

SUMMARY OF THE INVENTION

The bearing take-up apparatus of the present invention includes a base having spaced upstanding end walls rigidly secured thereto. A bearing housing is slidably mounted on the base between the end walls and has cavities on its upper surface. A threaded take-up screw mechanism includes a threaded rod with bearing advancing nuts screwed on the rod and positioned to be received in the bearing cavities. Washers near the outer ends of the rod and screw anchoring nuts are rigidly secured to both ends of the rod. The screw mechanism is lowered upon the upper surface of the end plates with the anchoring nuts and washers overhanging the end walls and with the bearing advancing nuts received within the bearing cavities for adjusting the bearing longitudinally of the base. An inverted V-shaped cover having slotted end brackets is then lowered over the screw and the brackets are then bolted to the end walls.

BRIEF DESCRIPTION OF THE DRAWINGS

FIG. 1 is a side elevation of the bearing take-up apparatus of the present invention with parts of the cover being cut away, and the near wall of a portion of the bearing housing being cut away to show one of the cavities in section and with the remainder of the bearing housing being shown in phantom.

FIG. 2 is a plan of FIG. 1 with parts of the cover being removed.

FIG. 3 is an end elevation with portions broken away, looking in the direction of arrows 3—3 of FIG. 1.

FIG. 4 is a pictorial view of a portion of a bearing take-up apparatus to better illustrate the manner of assembling the several components of the bearing take-up apparatus.

DESCRIPTION OF THE PREFERRED EMBODIMENT

A bearing take-up apparatus 10 (FIGS. 1-4) of the present invention is directed to an arrangement of components which permits a much faster method of assembling the several components than was possible with similar prior art take-up assemblies. After the take-up apparatus has been assembled, it will be apparent that the ultimate use of the take-up apparatus is the same as the prior art apparatus; that is, to tension belts or chains trained around pulleys or the like that are secured to a shaft journaled in two side-by-side bearing take-up apparatus.

The bearing take-up apparatus 10 in general comprises a base or base frame 12, a bearing housing 14, a threaded adjusting or take-up screw mechanism 16, and a cover 18 secured to the base frame 12.

More particularly, the base frame 12 comprises an inverted fabricated channel 20 having inwardly turned end portions 22. Bolt holes 24 are formed in the upper surface 26 of the channel 20 and are aligned with semi-cylindrical slots 28 in the end portions 22 for receiving bolts (not shown) or the like which rigidly secure the base frame to a supporting surface when placed in operation.

In the preferred embodiment, the length of the base lies within the range of about 28.5–56.5 inches (72–144 cm) to provide at least four different sizes of take-up apparatus providing bearing adjustment lengths of 12, 18, 24 and 30 inches (31, 45.5, 60 and 76 cm). When the three layer bases are used, one or more reinforcing straps 30 (FIGS. 1 and 2) are welded across the sides of the base to stiffen the same.

The base frame 12 also includes a pair of end walls 32 which are rigidly secured to the end portions of the channel 20. Each end wall 32 is generally U-shaped and includes a transverse plate 34 having a pair of gussets or side walls 36 bent outwardly therefrom with the lower edges of plate 34 and the gussets 36 welded to the upper surface and side walls, respectively, of the base frame 12. Pairs of apertures 38, which are preferably square aperatures to receive the heads of square neck bolts 40, are formed in each gusset 36. The upper surface 42 of each transverse plate 34 supports one overlapping end portion of the take-up screw mechanism 16 and is preferably flat as best shown in FIG. 4, although it will be understood that the upper surface may be provided with a depressed concave arcuate portion to cradle the screw mechanism 16 if desired.

The bearing housing 14 is a well known commercial item and includes a bearing unit, such as a ball bearing, a roller bearing, or babbitted bearing unit. The bearing housing 14 includes upper and lower ears 44 which slidably maintain the bearing housing in position between the base frame 12 and the cover 18. The upper surface of the bearing housing is also provided with abutment surfaces which define cavities 46 that receive portions of the take-up screw mechanism 16.

The take-up screw mechanism 16 comprises a threaded rod or adjustment screw 50 of proper length having a pair of square bearing advancing nuts 52 screwed thereon, a pair of washers 54, and a pair of hexagonal nuts 56 on opposite ends portions of the screw and secured in place by split pins 58 or the like. The screw mechanism 16 is then placed on the upper surfaces 42 of the end walls 32 with the nuts 56 and washers 54 overlapping the end walls 32 and with the square nuts 52 positioned within the cavities 46 of the bearing housing 14. It will be understood that a portion of the adjusting screw 50 is received within U-shaped slots (not shown) in the walls of the cavities 46.

The cover 18 preferably comprises an angle bar 60 of proper length with its apex directed upwardly as best shown in FIGS. 3 and 4. Fabricated tabs or end brackets 62 of generally U-shaped construction each include a transverse wall 64 and side walls 66. Each transverse wall 64 includes a vertically extending open bottomed slot 68 (FIGS. 3 and 4) and a generally V-shaped upper end that is preferably welded to the associated end portion of the angle bar 60. The side walls 66 are apertured to receive the previously referred to square neck bolts 40 when the cover is lowered over the take-up screw mechanism 16 into position to be secured to the base frame 12. When fully assembled as best shown in FIGS. 1-3, the fabricated end bracket 62 of the cover are received within the associated U-shaped end walls 32 of the base frame 12 with the associated washers 54 and hexagonal nuts 56 being disposed outside of and overhanging adjacent transverse walls 34,64. Thus, when the bolts 40 are tightened, a simple, sturdy, and easily assembled bearing take-up apparatus is provided.

It will be understood that the bearing housing 14 is moved in one direction longitudinally of the base frame 12 by engaging one of the nuts 56 and rotating the screw 50 in one direction; while rotation of the screw in the opposite direction will move the bearing housing in the opposite direction.

It has been determined that the time required to assemble the above described bearing take-up mechanism 10 is about one-half that required when assembling assignee's previously described prior art mechanism. Also, the steps taken when assembling the take-up apparatus 10 is much more efficient and stable as compared to that of assembling the components when inverted thus minimizing injury to personnel when assembling the bearing take-up mechanism 10.

The steps taken when assembling the take-up apparatus 10 comprises placing the base frame 12 on a bench or the like in upright position, placing the bearing housing 14 on the base frame, spacing the square nuts 52 in positions to be received by the cavities 46 of the bearing housing 14 and then placing the take-up screw mechanism 16 onto the upper surface 42 of the end walls with the nuts 52 received in the bearing cavities 46 thus preventing the take-up screw from rolling, lowering the cover into position over the screw mechanism 16, with the screw being received by the slot 68 in the bracket 62 and with the washers 54 and hexagonal nuts 56 overlapping the wall 32, and thereafter bolting the cover end bracket 62 to the associated base end walls 32.

From the foregoing description it is apparent that an improved bearing take-up apparatus is provided which greatly minimizes assembly time and thus the cost of the apparatus yet provides a sturdy apparatus with the adjusting screw well protected from falling objects.

Although the best mode contemplated for carrying out the present invention has been herein shown and described it will be apparent that modification and variation may be made without departing from what is regarded to be the subject matter of the invention.

What is claimed is:

1. In a take-up apparatus for adjustable mounting of a bearing housing, comprising:
   a base;
   a pair of end walls attached to the base;
   a threaded adjustment screw;
   screw anchoring means rigidly secured to both ends of said adjustment screw and positioned adjacent corresponding sides of said end walls with said adjustment screw supported on upper surfaces of said end walls for precluding both longitudinal and downward movement of said adjustment screw;
   slotted end brackets receivable over said adjustment screw for allowing rotation while precluding both upward and transverse movement thereof relative to said base;
   means for releasably connecting said brackets to said base; and a cover carried by said brackets.

2. An apparatus according to claim 1 wherein said end walls are generally U-shaped and include transverse end plates defining said screw supporting upper surfaces.

3. An apparatus according to claim 2 wherein said upper surfaces are flat, substantially horizontal surfaces.

4. An apparatus according to claim 3 wherein said brackets are U-shaped and are rigidly secured to said cover, and wherein said connecting means connects longitudinally extending portions of said brackets to adjacent longitudinally extending portions of said end walls.

5. An apparatus according to claim 1 wherein said screw anchoring means includes nuts threaded on the ends of said adjustment screw, pins rigidly securing said nuts in said desired positions and cooperating washers disposed in engagement with said nuts.

6. A bearing take-up apparatus comprising: means defining a base frame including an elongated support channel, a pair of end walls rigidly secured to said channel, and means defining transversely extending upper surfaces on said walls; a bearing housing slidably received on said support channel between said end walls and having a bearing therein, said bearing housing including abutment means defining at least one upwardly opening cavity; means defining a take-up screw mechanism including a threaded rod supported on said upper wall surfaces, at least one bearing advancing element threaded on said rod and positioned in said bearing cavity, and rod anchoring means rigidly secured to the ends of said rod externally of the adjacent end walls; means defining a cover including an elongated beam extending over and shielding the upper surface of said take-up screw, slotted end brackets disposed between said cover beam and the upper surface of said rod and having portions extending downwardly along the sides of said threaded rod for maintaining the screw parallel to said channel; and connecting means for releasably interconnecting said brackets and said cover to said end walls.

7. An apparatus according to claim 6 wherein said brackets are rigidly secured to said cover beam, and wherein said connecting means connects the brackets directly to said end walls.

8. An apparatus according to claim 7 wherein said brackets and said end walls are generally U-shaped, each wall including a transverse member and a pair of longitudinally extending members, and wherein said connecting means interconnects the adjacent longitudinally extending members of the brackets to the walls.

9. An apparatus according to claim 8 wherein said U-shaped brackets are slidably received within said U-shaped walls.

10. An apparatus according to claim 6 wherein a pair of upwardly opening cavities are provided in said bearing housing, and wherein a pair of said bearing advancing elements are threaded on said rod and are positioned to be lowered into associated ones of said cavities.

11. An apparatus according to claim 6 wherein said rod anchoring means are nuts threaded on opposite ends of the rods and cooperating washers, and means for rigidly securing said nuts at desired axial spacings on said rod.

* * * * *